United States Patent
Kasano et al.

(10) Patent No.: US 10,146,052 B2
(45) Date of Patent: Dec. 4, 2018

(54) VIRTUAL IMAGE DISPLAY APPARATUS, HEAD-UP DISPLAY SYSTEM, AND VEHICLE

(71) Applicant: Panasonic Intellectual Property Management Co., Ltd., Osaka (JP)

(72) Inventors: Masahiro Kasano, Osaka (JP); Kouki Ichihashi, Osaka (JP); Yosuke Asai, Osaka (JP); Katsuhiko Hayashi, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 215 days.

(21) Appl. No.: 15/214,841

(22) Filed: Jul. 20, 2016

(65) Prior Publication Data

US 2016/0327791 A1    Nov. 10, 2016

Related U.S. Application Data

(63) Continuation of application No. PCT/JP2015/000456, filed on Feb. 3, 2015.

(30) Foreign Application Priority Data

Mar. 27, 2014    (JP) .................................. 2014-065187

(51) Int. Cl.
*G02B 27/01*    (2006.01)
*B60K 35/00*    (2006.01)
(Continued)

(52) U.S. Cl.
CPC .......... *G02B 27/0101* (2013.01); *B60K 35/00* (2013.01); *G02B 27/01* (2013.01);
(Continued)

(58) Field of Classification Search
CPC ........................ G02B 27/01; G02B 27/0101; G02B 27/2214; B60K 35/00; B60K 2350/1072; B60K 2350/2065
(Continued)

(56) References Cited

U.S. PATENT DOCUMENTS 9,781,407 B2 * 10/2017 Watanabe .......... H04N 13/0409
2001/0050813 A1 * 12/2001 Allio .................. G02B 27/2214
359/462
(Continued)

FOREIGN PATENT DOCUMENTS

JP    7-287193    10/1995
JP    8-62562    3/1996
(Continued)

OTHER PUBLICATIONS

International Search Report dated Mar. 17, 2015 in corresponding International Application No. PCT/JP2015/000456.
(Continued)

*Primary Examiner* — William R Alexander
(74) *Attorney, Agent, or Firm* — Wenderoth, Lind & Ponack, L.L.P.

(57) ABSTRACT

The present disclosure provides a virtual image display apparatus, head-up display system, and vehicle that distribute a spatially divided parallax image between a left eye and right eye of a user appropriately. The virtual image display apparatus according to the present disclosure includes a display device configured to spatially divide with a first pitch and to output right-eye images and left-eye images, first optical members periodically disposed with a second pitch, distributing light based on the output from the display device between a right-eye direction and a left-eye direction, and a second optical member configured to reflect or refract, by positive power, the light distributed between the right-eye (Continued)

direction and the left-eye direction by the first optical members. The first pitch is narrower than the second pitch.

3 Claims, 7 Drawing Sheets

(51) Int. Cl.
    *G02B 27/22*     (2018.01)
    *H04N 5/64*     (2006.01)

(52) U.S. Cl.
    CPC .. *G02B 27/2214* (2013.01); *B60K 2350/1072* (2013.01); *B60K 2350/2065* (2013.01); *H04N 5/64* (2013.01)

(58) Field of Classification Search
    USPC ........................................................ 359/464
    See application file for complete search history.

(56) References Cited

U.S. PATENT DOCUMENTS

| | | | | |
|---|---|---|---|---|
| 2002/0118452 | A1* | 8/2002 | Taniguchi | G02B 27/2214 359/463 |
| 2004/0239231 | A1 | 12/2004 | Miyagawa et al. | |
| 2005/0219693 | A1* | 10/2005 | Hartkop | G02B 27/2214 359/462 |
| 2006/0238863 | A1 | 10/2006 | Saishu | |
| 2008/0043092 | A1* | 2/2008 | Evans | G02B 27/2214 348/36 |
| 2008/0211976 | A1* | 9/2008 | Nam | G09G 3/001 349/15 |
| 2010/0328438 | A1 | 12/2010 | Ohyama et al. | |
| 2011/0007390 | A1* | 1/2011 | Yanamoto | G02B 27/2214 359/466 |
| 2011/0090419 | A1* | 4/2011 | Yokoyama | G02B 27/2214 349/57 |
| 2012/0019908 | A1* | 1/2012 | Choi | G02B 27/2214 359/463 |
| 2012/0062991 | A1* | 3/2012 | Krijn | H04N 13/0404 359/463 |
| 2012/0105954 | A1* | 5/2012 | Prouty, IV | G02B 27/2214 359/462 |
| 2012/0320170 | A1* | 12/2012 | Lee | G02B 27/2214 348/54 |
| 2013/0215111 | A1* | 8/2013 | Yokoyama | G02B 27/2214 345/419 |
| 2013/0242386 | A1* | 9/2013 | Koito | G02B 27/2214 359/464 |
| 2014/0125783 | A1* | 5/2014 | Chung | G09G 3/3614 348/51 |
| 2014/0177046 | A1* | 6/2014 | Lee | G02B 27/2214 359/464 |
| 2014/0192044 | A1* | 7/2014 | Hwang | H04N 13/0415 345/419 |
| 2014/0268324 | A1* | 9/2014 | Rosenthal | G02B 27/2214 359/462 |
| 2015/0138456 | A1* | 5/2015 | Liao | G02B 27/2214 349/15 |
| 2017/0269353 | A1* | 9/2017 | Xu | G02B 26/0875 |

FOREIGN PATENT DOCUMENTS

| | | |
|---|---|---|
| JP | 2000-111834 | 4/2000 |
| JP | 2005-301144 | 10/2005 |
| JP | 2006-267928 | 10/2006 |
| JP | 2014-50062 | 3/2014 |
| WO | 2004/040354 | 5/2004 |

OTHER PUBLICATIONS

The Extended European Search Report dated Mar. 2, 2017 for the related European Patent Application No. 15768960.5.

\* cited by examiner

VIRTUAL IMAGE DISPLAY APPARATUS, HEAD-UP DISPLAY SYSTEM, AND VEHICLE

BACKGROUND

1. Technical Field

The present disclosure relates to a virtual image display apparatus, a head-up display system including the virtual image display apparatus, and a vehicle including the head-up display system.

2. Description of Related Art

A head-up display (HUD) superimposes an image in which assistance information for supporting driving is drawn on a scene ahead of a driver on a vehicle, such as an automobile, and displays the image as a virtual image. Unexamined Japanese Patent Publication No. 2005-301144 discloses a virtual image display apparatus that alters a distance at which a virtual image is displayed by altering an amount of parallax of a left-eye virtual image and a right-eye virtual image to cause each of both right and left eyes to make a visual identification, and by fusing the virtual images.

SUMMARY

In virtual image display, in order to provide a stereoscopic vision, it is necessary to distribute parallax images between a left eye and right eye of a user appropriately.

The present disclosure provides a virtual image display apparatus, head-up display system, and vehicle that distribute spatially divided parallax images between the left eye and right eye of the user appropriately.

The virtual image display apparatus according to the present disclosure includes a display device configured to spatially divide with a first pitch and to output right-eye images and left-eye images, first optical members periodically disposed with a second pitch, distributing light based on the output of the display device between a right-eye direction and a left-eye direction, and a second optical member configured to reflect or refract, by positive power, the light distributed between the right-eye direction and the left-eye direction by the first optical members. The first pitch is narrower than the second pitch.

The virtual image display apparatus according to the present disclosure is capable of distributing spatially divided parallax images between the left eye and right eye of the user appropriately.

DESCRIPTION OF EMBODIMENT

An exemplary embodiment will be described in detail below with reference to the drawings as needed. However, a description more detailed than necessary may be omitted. For example, a detailed description of an already well-known item and a repeated description of substantially identical components may be omitted. This is for avoiding the following description from becoming unnecessarily redundant and for making the description easier for a person skilled in the art to understand.

It is to be noted that the accompanying drawings and the following description are provided in order for a person skilled in the art to fully understand the present disclosure, and are not intended to limit the subject described in the appended claims.

FIRST EXEMPLARY EMBODIMENT

[1. Configuration of a Head-up Display System]

Figure 1:
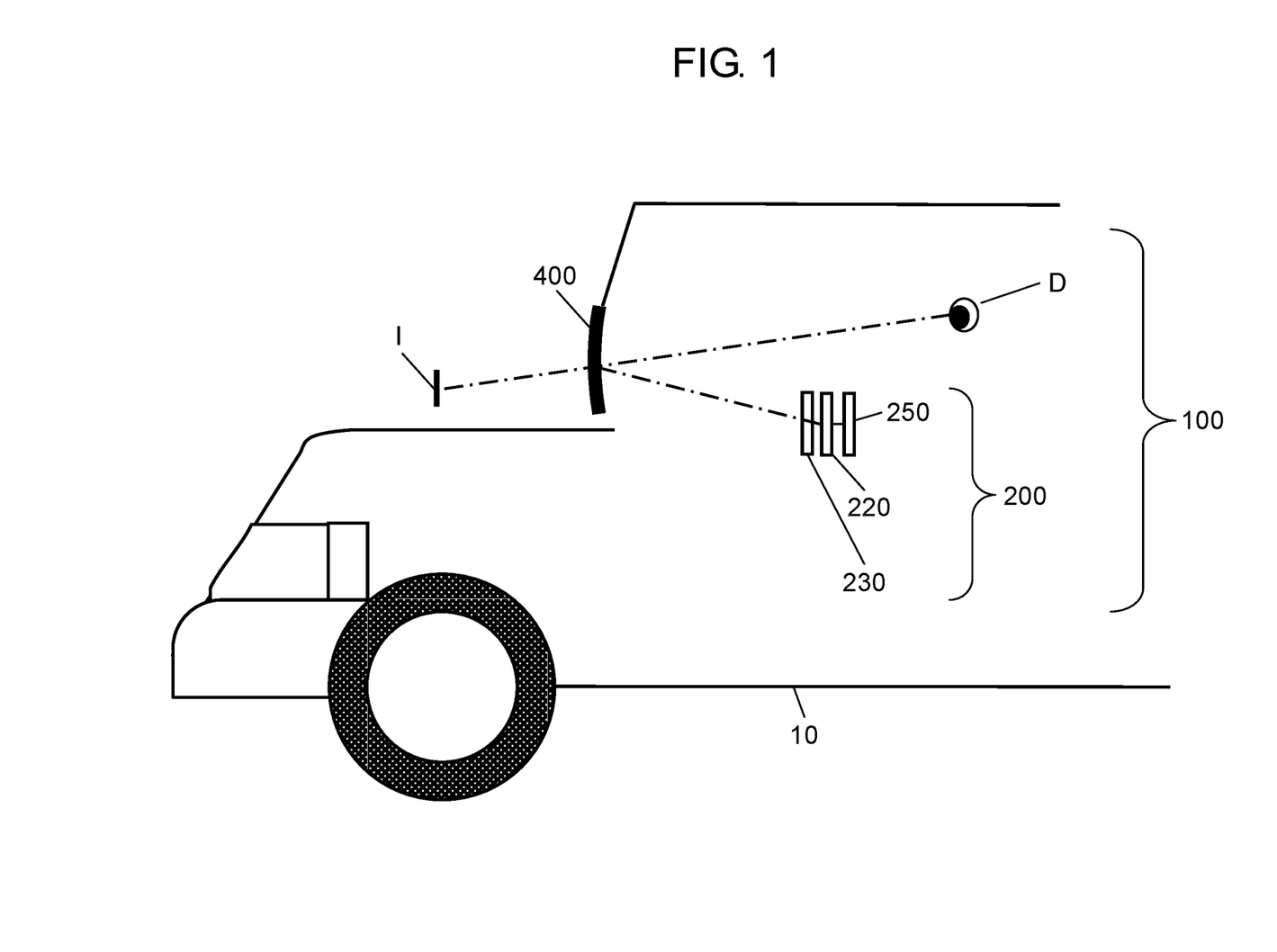
FIG. 1 is a diagram illustrating a configuration of a head-up display system according to a first exemplary embodiment.

A head-up display system to be described in the present exemplary embodiment is installed, for example, in a driver's seat of an automobile. FIG. 1 is a diagram illustrating a configuration of head-up display system 100 according to the first exemplary embodiment. Head-up display system 100 is installed in automobile 10. Head-up display system 100 includes virtual image display apparatus 200 and combiner 400.

Virtual image display apparatus 200 includes display device 220, parallax barrier 230, and controller 250, such as a microcomputer. Virtual image display apparatus 200 is disposed, for example, inside a dashboard of automobile 10, reflects an image displayed by display device 220 via combiner 400, leads the image to observer D inside automobile 10, and displays virtual image I.

As display device 220, a display such as a liquid crystal display, an organic EL (Electroluminescence) display, and a plasma display is used. Display device 220 displays various kinds of information, such as road traffic information, a distance to a vehicle ahead, remaining battery power of automobile 10, and current vehicle speed, in accordance with control from controller 250.

Combiner 400 is an optical member with positive power, and includes a concave mirror. Combiner 400 has semi-transparent mirror structure, and reflects part of light projected from display device 220 in a direction of observer D. A distance between combiner 400 and display device 220 is set to be shorter than a focal length, whereby observer D recognizes virtual image I through combiner 400.

[2. Configuration of the Display Device and the Parallax Barrier]

Figure 2:
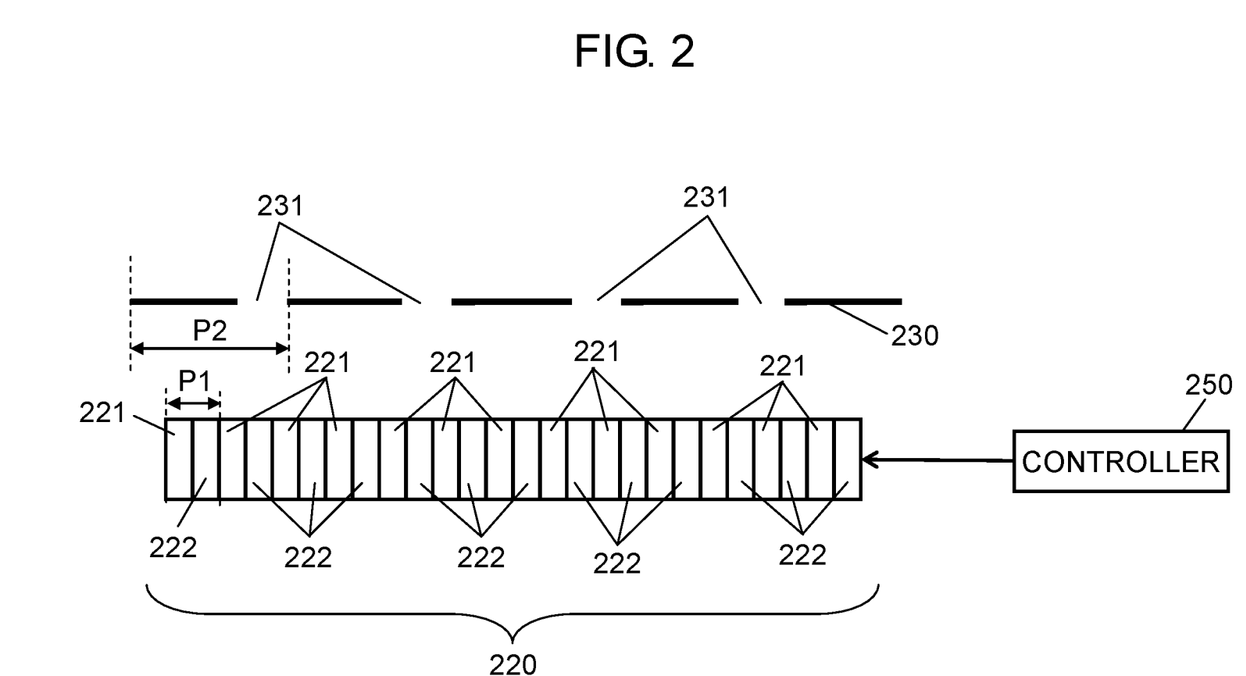
FIG. 2 is a block diagram illustrating a configuration of a display device, a parallax barrier, and a controller according to the first exemplary embodiment.

Next, a configuration of display device 220 and parallax barrier 230 will be described in detail. FIG. 2 is a configuration diagram of display device 220, parallax barrier 230, and controller 250.

Display device 220 has pixels each including R (RED), G (Green), and B (Blue). In the first exemplary embodiment, respective pixels of display device 220 are spatially divided into left-eye pixels 221 and right-eye pixels 222. Respective pixels of display device 220 are alternately allocated as left-eye pixels 221 and right-eye pixels 222. Pixel pairs each formed of one pair of each of left-eye pixels 221 and each of right-eye pixels 222 are disposed with predetermined pixel pitch P1. That is, a unit cycle of each pixel of right-eye pixel 221 and left-eye pixel 222 is (P1)/2.

Parallax barrier 230 is formed on an unillustrated glass substrate in a one-dimensional stripe, for example, through evaporation of light-shielding materials, such as chromium, on the glass substrate. Portions in which the light-shielding materials, such as chromium, are not evaporated serve as apertures 231. In parallax barrier 230, light-shielding portions and apertures 231 are provided alternately and periodically, and apertures 231 are formed with predetermined pitch P2. A width of each of apertures 231 and a width of each of the light-shielding portions on parallax barrier 230 may not be identical. After light emitted from display device 220 undergoes distribution control by apertures 231 and is reflected by combiner 400, light emitted from left-eye pixels 221 reaches a left eye of observer D, whereas light emitted from right-eye pixels 222 reaches a right eye of observer D. This allows display device 220 and parallax barrier 230 to present a parallax image with parallax to observer D.

Controller 250 controls the image displayed by display device 220. Display device 220 outputs the image to be displayed in accordance with control from controller 250.

Figure 3:
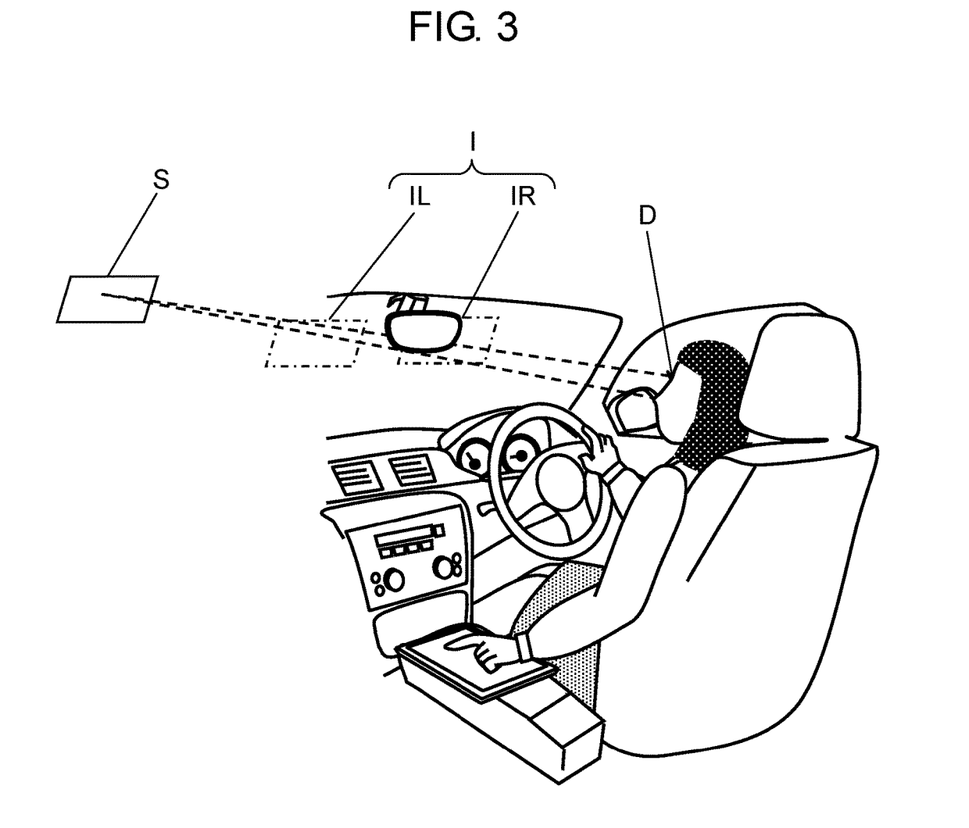
FIG. 3 is a diagram illustrating a relation among a left-eye image and a right-eye image of an observer, and a stereoscopic image according to the first exemplary embodiment.

FIG. 3 is a diagram illustrating a relation among observer D's left-eye virtual image IL and right-eye virtual image IR, and stereoscopic image S. When observer D uses head-up display system 100, left-eye virtual image IL and right-eye virtual image IR, which are a virtual image I of the parallax image, will be displayed at predetermined positions. By looking at left-eye virtual image IL and right-eye virtual image IR, observer D perceives as if stereoscopic image S created through stereoscopic look and fusion of these images existed far away from the predetermined positions.

[3. Relation Between the Pitch of the Pixel Pairs and the Pitch of the Parallax Barrier]

In head-up display system 100, in order to provide a stereoscopic vision, different images are displayed for a left eye and a right eye. That is, all light emitted from right-eye pixels 222 needs to enter the right eye of observer D, whereas all light emitted from left-eye pixels 221 needs to enter the left eye of observer D.

The present inventors have found out that, in order to distribute the light emitted from respective pixels of display device 220 appropriately between the right eye and the left eye, it is preferable that pitch P2 of parallax barrier 230 be larger than pixel pitch P1 of the pixel pairs of left-eye pixels 221 and right-eye pixels 222.

A relation between pitch P1 of the pixel pairs and pitch P2 of parallax barrier 230 in head-up display system 100 will be described in detail.

Figure 4:
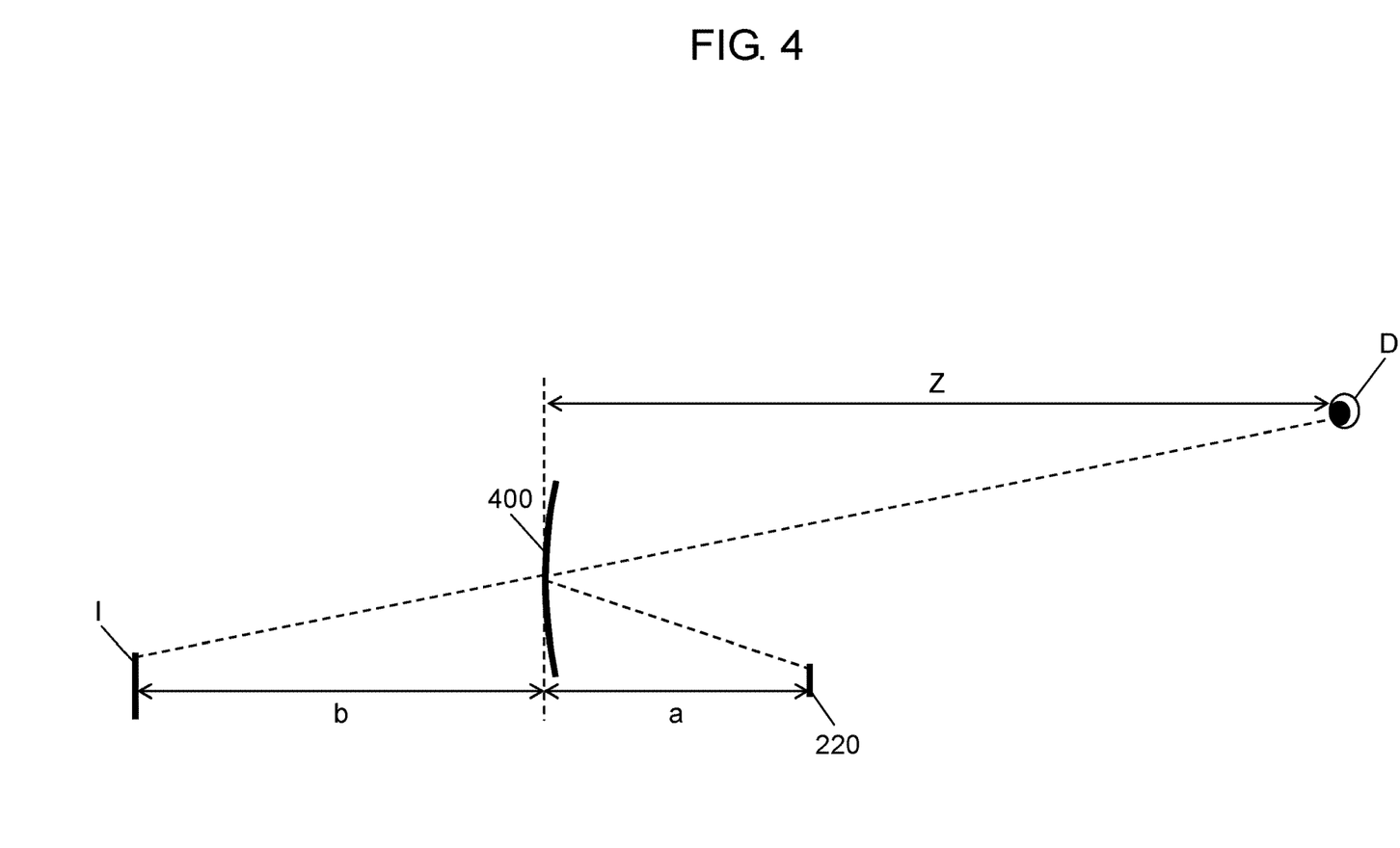
FIG. 4 is a first diagram illustrating a relation between pitch P1 of pixel pairs and pitch P2 of the parallax barrier.

First, distance L between parallax barrier 230 and display device 220 will be described. FIG. 4 is a first diagram illustrating a relation between pitch P1 of the pixel pairs and pitch P2 of parallax barrier 230. It is assumed in FIG. 4 that a distance between observer D and combiner 400 is Z, that a distance between combiner 400 and display device 220 is a, and that a distance between combiner 400 and virtual image I is b.

If lens power of combiner 400 is φ, focal length f is 1/φ. In a case where distance a is smaller than focal length f, observer D may recognize virtual image I. Here, distance b is expressed by Equation 1.

$$b = a*f/(a+f) \quad \text{[Equation 1]}$$

Magnification M of combiner 400 is expressed by Equation 2.

$$M = |b/a| \quad \text{[Equation 2]}$$

Here, since a right-eye pixel size and left-eye pixel size of display device 220 are (P1)/2, a right-eye pixel size and left-eye pixel size of virtual image I are (M*P1)/2.

Figure 5:
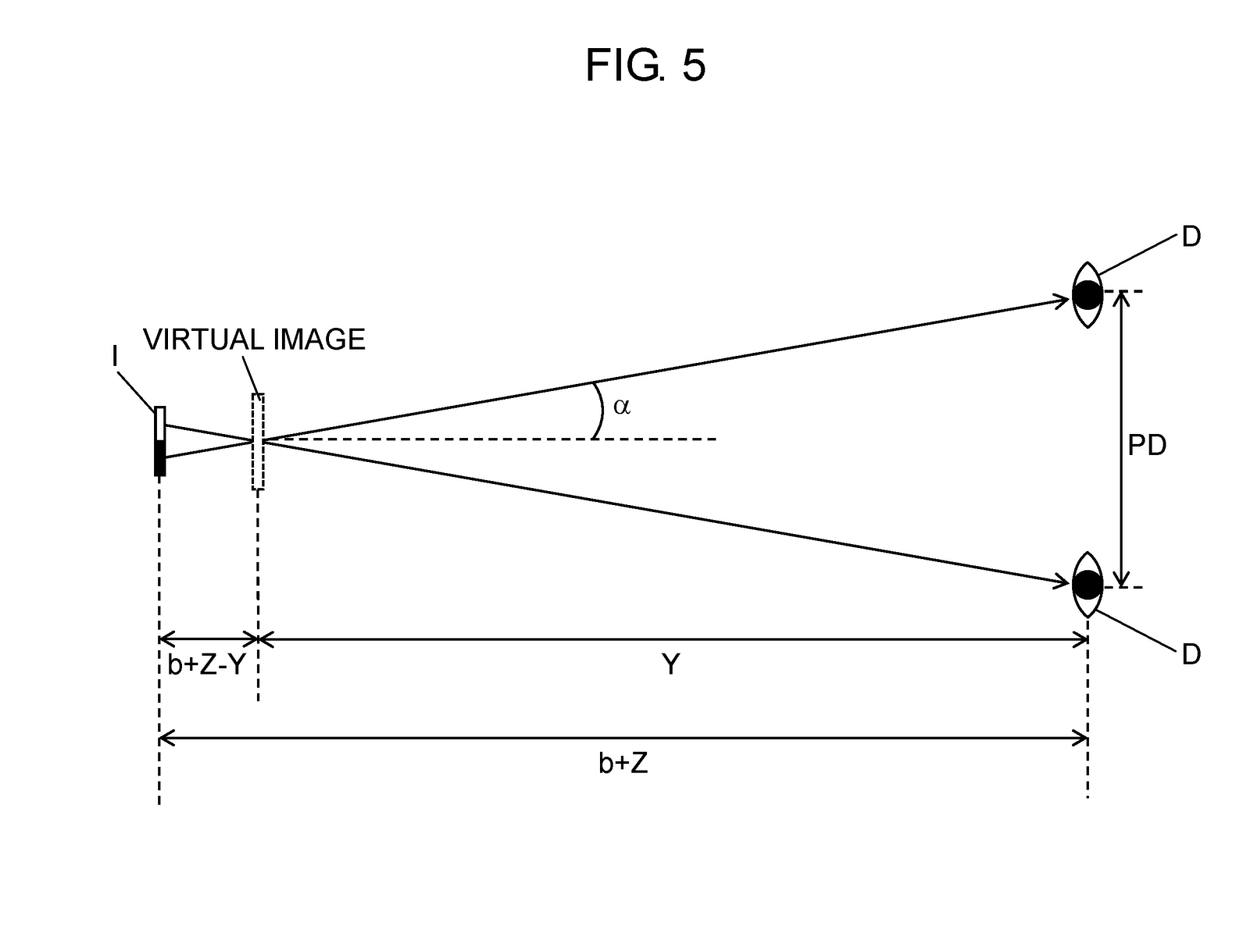
FIG. 5 is a second diagram illustrating a relation between pitch P1 of the pixel pairs and pitch P2 of the parallax barrier.

FIG. 5 is a second diagram illustrating a relation between pitch P1 of the pixel pairs and pitch P2 of parallax barrier 230. It is assumed in FIG. 5 that a distance from a virtual image barrier to observer D is Y, and that a distance between the eyes of observer D is PD. Here, the virtual image barrier is a barrier that exists at an imaginary virtual image position of parallax barrier 230. When the right-eye pixel size and left-eye pixel size of virtual image I and distance PD are used, Equation 3 holds for a relation between a distance (b+Z−Y) from the virtual image barrier to virtual image I and distance Y, from a similitude relation of triangles.

$$b+Z-Y{:}Y = (M*P1)/2{:}PD \quad \text{[Equation 3]}$$

Therefore, distance Y from the virtual image barrier to observer D is as follows.

$$Y = \{PD*(b+Z)\}/\{(M*P1)/2+PD\} \quad \text{[Equation 4]}$$

Emission angle α of light that reaches the eyes of observer D from the virtual image barrier may be expressed by Equation 5.

$$\alpha = a\,\tan(PD/2Y) \quad \text{[Equation 5]}$$

Figure 6:
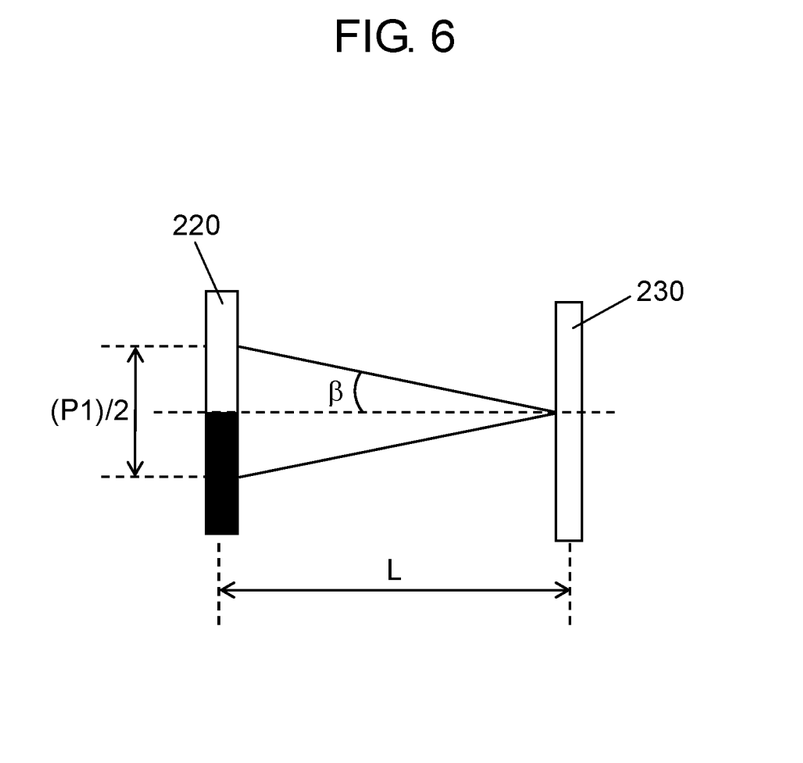
FIG. 6 is a third diagram illustrating a relation between pitch P1 of the pixel pairs and pitch P2 of the parallax barrier.

FIG. 6 is a third diagram illustrating a relation between pitch P1 of the pixel pairs and pitch P2 of parallax barrier 230. In FIG. 6, since magnification of virtual image I is M, emission angle β of light that reaches the eyes of observer D from display device 220 is expressed by Equation 6.

$$\beta = a\,\tan(PD/2Y)*M \quad \text{[Equation 6]}$$

Here, since the right-eye pixel size and left-eye pixel size of display device 220 are (P 1)/2, distance L between parallax barrier 230 and display device 220 for emitting the light at emission angle β will be as follows.

$$L = (P1)/\{4*\tan(a\,\tan(PD/2Y)*M)\} \quad \text{[Equation 7]}$$

By setting distance L in this way, only the right-eye pixels of display device 220 are displayed for the right eye of observer D, and only the left-eye pixels of display device 220 are displayed for the left eye of observer D.

As described above, distance L between display device 220 and parallax barrier 230 is determined from power φ of combiner 400, distance a between combiner 400 and display device 220, distance Y between combiner 400 and observer D, and pitch P1 of the pixel pairs.

Figure 7:
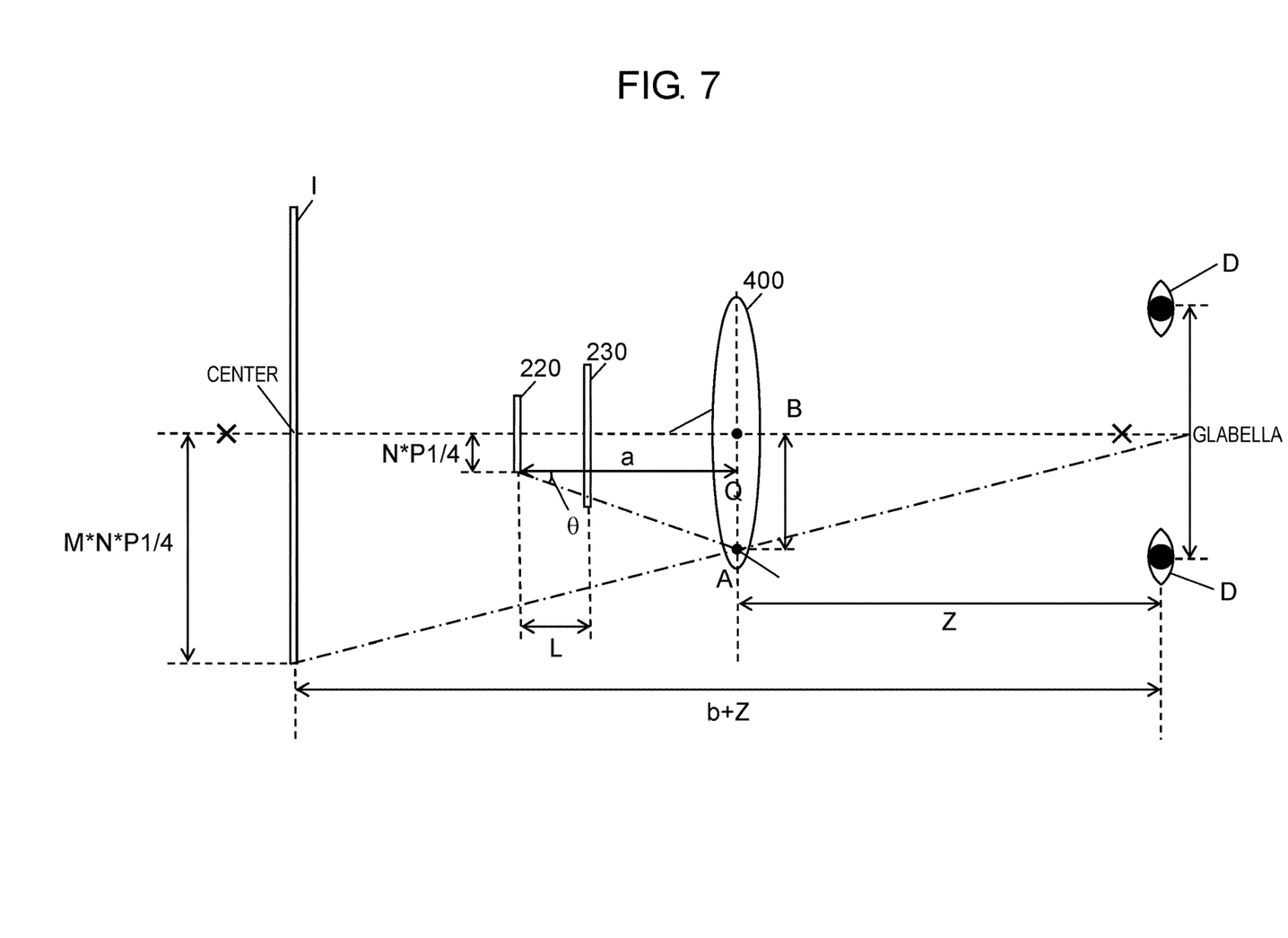
FIG. 7 is a fourth diagram illustrating a relation between pitch P1 of the pixel pairs and pitch P2 of the parallax barrier.

Next, a relation between pitch P1 of the pixel pairs and pitch P2 of parallax barrier 230 will be described. FIG. 7 is a fourth diagram illustrating a relation between pitch P1 of the pixel pairs and pitch P2 of parallax barrier 230.

It is assumed that a number of total pixels of right-eye pixels 221 and left-eye pixels 222 in a horizontal direction is N. Since the right-eye pixel size and left-eye pixel size of display device 220 are (P1)/2, the right-eye pixel size and left-eye pixel size of virtual image I are (M*P1)/2. Therefore, the size of virtual image I of display device 220 will be N*(M*P1)/2.

When it is assumed that point A is a point of intersection of combiner 400 and a straight line that connects one end of virtual image I in a horizontal direction and a position of a glabella of observer D, and that point B is a point of intersection of combiner 400 and a straight line that connects a center of virtual image I and the position of the glabella of observer D, Equation 8 holds for distance Q between point A and point B, from a similitude relation of triangles.

$$b+Z{:}(M*N*P1)/4 = Z{:}Q \quad \text{[Equation 8]}$$

Accordingly, Equation 9 holds.

$$Q=(M*N*P1*Z)/4*(b+Z) \quad \text{[Equation 9]}$$

Therefore, emission angle θ of light that reaches the glabella of observer D from a pixel of an end of display device 220 in a horizontal direction will be as follows.

$$\theta = a\tan\{(Q-(N*P1)/4)/a\} \quad \text{[Equation 10]}$$

A width of parallax barrier 230 will be as follows.

$$\{(N*P1)/4+L*\tan\theta\}*2 \quad \text{[Equation 11]}$$

When the width of parallax barrier 230 is divided by N/2, half of the number of total pixels N of right-eye pixels 222 and left-eye pixels 221, that is, by a number of total pixels of right-eye pixels 222 or total pixels of left-eye pixels 221, $$P2=\{(P1*N)+4*L*\tan\theta\}/N \quad \text{[Equation 12]}$$

is obtained, and $$P2=P1+(4*L*\tan\theta/N) \quad \text{[Equation 13]}$$

is obtained.

Since L, tan θ, and N are positive numbers, P2>P1 holds. Therefore, when combiner 400 with positive power is laid on an optical path, in order to distribute the images between right images and left images appropriately for the eyes of observer D, P2>P1 is preferable.

When it is assumed, for example, that distance PD between the eyes of observer D is 65 mm, that lens power φ of combiner 400 is 1/180 (1/mm), that focal length f is 180 mm, that distance a from display device 220 to combiner 400 is 130 mm, distance b from combiner 400 to virtual image I is 468 mm. That is, magnification M is 3.6. When it is assumed that the pixel size of each of right-eye pixels 222 and pixel size of each of left-eye pixels 221 of display device 220 are 0.0875 mm, the right-eye pixel size and left-eye pixel size of virtual image I are 0.315 mm, and pitch P1 of the pixel pairs is 0.175 mm.

When it is assumed here that a distance from combiner 400 to observer D is 840 mm, a distance from virtual image I to observer D is 1308 mm. Emission angle α of light pointed at observer D from the virtual image barrier is calculated to be 1.43°. That is, emission angle β of light that reaches the eyes of observer D from display device 220 may be set at 5.15°, and a distance from display device 220 to parallax barrier 230 is 0.485 mm.

When the number of total pixels N of right-eye pixels 221 and left-eye pixels 222 in the horizontal direction is 480 pixels, magnification M is 3.6, and thus a width of display device 220 of virtual image I is 42 mm. Accordingly, distance Q between AB is 48.55 mm.

Therefore, emission angle θ of light that reaches the glabella of observer D from the pixel of the end of display device 220 in the horizontal direction will be 11.966°, and the width of parallax barrier 230 will be 42.21 mm. Accordingly, pitch P2 of parallax barrier 230 will be 0.1759 mm.

[4. Effect, Etc.]

As described above, the spatially divided parallax images may be distributed appropriately between the left eye and right eye of observer D, by setting pitch P2 of parallax barrier 230 to be larger than pitch P1 of the pixel pairs of left-eye pixels 221 and right-eye pixels 222.

Note that, the present exemplary embodiment, in which description is given using the parallax barrier, is not limited to this example. That is, another configuration may also be used if the configuration is capable of controlling distribution of light projected from a display device, such as a lenticular lens and a liquid crystal lens. Even in another configuration, in a similar manner, pitch P1 of the pixel pairs of the left-eye pixels and right-eye pixels of the display device is configured to be narrower than pitch P2 of the lenticular lens or pitch P2 of the liquid crystal lens.

Note that, the present exemplary embodiment, which describes the head-up display system that uses the combiner, is not limited to this example. For example, a mirror with positive power or a convex lens may be used for virtual image display.

The virtual image display apparatus and the head-up display system including the virtual image display apparatus according to the present disclosure are applicable not only to a use for vehicles, such as an automobile, but also to uses such as a cockpit of an airplane or a vessel, a simulation system that allows a user to experience a bodily sensation of operations of a game machine, etc.

The invention claimed is:

1. A virtual image display apparatus comprising:
   a display device configured to display right-eye pixels that constitute a right-eye image, and left-eye pixels that constitute a left-eye image;
   first optical members disposed on an emission surface of the display device, the first optical members distributing light based on output from the display device between a right-eye direction and a left-eye direction; and
   a second optical member configured to reflect or refract, by positive power, the light distributed between the right-eye direction and the left-eye direction by the first optical members,
   wherein pixel pairs each formed through pairing of two adjacent pixels including one of the right-eye pixels and one of the left-eye pixels are disposed with a first pitch,
   the first optical members are periodically disposed with a second pitch wider than the first pitch, and
   a relation between the first pitch and the second pitch satisfies a following formula, $$P2=P1+(4*L*\tan\theta/N)$$

where
   P1 is the first pitch,
   P2 is the second pitch,
   L is a distance between the first optical members and the display device,
   θ is an emission angle of light that reaches a glabella of a user from a pixel of an end of the display device, and
   N is a number of total pixels of the display device.

2. A head-up display system comprising:
   a virtual image display apparatus including:
     a display device configured to display right-eye pixels that constitute a right-eye image, and left-eye pixels that constitute a left-eye image;
     first optical members disposed on an emission surface of the display device, the first optical members distributing light based on output from the display device between a right-eye direction and a left-eye direction; and
     a second optical member configured to reflect or refract, by positive power, the light distributed between the right-eye direction and the left-eye direction by the first optical members,
   wherein pixel pairs each formed through pairing of two adjacent pixels including one of the right-eye pixels and one of the left-eye pixels are disposed with a first pitch,
   the first optical members are periodically disposed with a second pitch wider than the first pitch, and a relation between the first pitch and the second pitch satisfies a following formula, $$P2=P1+(4*L*\tan\theta N)$$

where
P1 is the first pitch,
P2 is the second pitch,
L is a distance between the first optical members and the display device,
θ is an emission angle of light that reaches a glabella of a user from a pixel of an end of the display device, and
N is a number of total pixels of the display device.

3. A vehicle comprising:
a head-up display system including:
   a display device configured to display right-eye pixels that constitute a right-eye image, and left-eye pixels that constitute a left-eye image;
   first optical members disposed on an emission surface of the display device, the first optical members distributing light based on output from the display device between a right-eye direction and a left-eye direction; and
   a second optical member configured to reflect or refract, by positive power, the light distributed between the right-eye direction and the left-eye direction by the first optical members,
wherein pixel pairs each formed through pairing of two adjacent pixels including one of the right-eye pixels and one of the left-eye pixels are disposed with a first pitch,
the first optical members are periodically disposed with a second pitch wider than the first pitch, and
a relation between the first pitch and the second pitch satisfies a following formula, $$P2=P1+(4*L*\tan\theta N)$$

where
P1 is the first pitch,
P2 is the second pitch,
L is a distance between the first optical members and the display device,
θ is an emission angle of light that reaches a glabella of a user from a pixel of an end of the display device, and
N is a number of total pixels of the display device.

* * * * *